United States Patent [19]

Havstad et al.

[11] Patent Number: 5,224,460
[45] Date of Patent: Jul. 6, 1993

[54] METHOD OF OPERATING AN AUTOMOTIVE TYPE INTERNAL COMBUSTION ENGINE

[75] Inventors: Peter H. Havstad, Plymouth; Rodney J. Tabaczynski, Northville, both of Mich.

[73] Assignee: Ford Motor Company, Dearborn, Mich.

[21] Appl. No.: 832,831

[22] Filed: Feb. 7, 1992

[51] Int. Cl.⁵ .................. F02M 25/07; F02M 35/10; F01L 1/34
[52] U.S. Cl. .................. 123/568; 123/52 MF; 123/90.16
[58] Field of Search ............ 123/52 MF, 90.16, 90.17, 123/316, 568, 569, 571

[56] References Cited

U.S. PATENT DOCUMENTS

| | | | |
|---|---|---|---|
| 2,773,490 | 12/1956 | Miller | 123/316 |
| 2,880,711 | 4/1959 | Roan | 123/90.16 |
| 2,997,991 | 8/1961 | Roan | 123/90.16 |
| 3,441,009 | 4/1969 | Rafanelli | 123/90.15 |
| 3,981,276 | 9/1976 | Ernest | 123/242 |
| 4,232,641 | 11/1980 | Curtil | 123/316 |
| 4,327,676 | 5/1982 | McIntire et al. | 123/90.6 |
| 4,357,917 | 11/1982 | Aoyama | 123/90.16 |
| 4,509,466 | 4/1985 | Bernardoni et al. | 123/52 MF |
| 4,700,684 | 10/1987 | Pischinger et al. | 123/568 |
| 4,722,315 | 2/1988 | Pickel | 123/568 |
| 4,724,809 | 2/1988 | Buranot | 123/90.16 |
| 4,917,058 | 4/1990 | Nelson et al. | 123/52 MF |
| 4,955,329 | 9/1990 | D'Angelo et al. | 123/52 MF |
| 5,133,310 | 7/1992 | Hitomi et al. | 123/90.16 |

Primary Examiner—Willis R. Wolfe
Attorney, Agent, or Firm—Jerome R. Drouillard; Roger L. May

[57] ABSTRACT

A method of operating an automotive type internal combustion engine to improve the efficiency and power, fuel economy, and emission control is obtained by phase shifting of both the intake and exhaust valve timing schedules or events, coupled with the use of reed valves in each intake port to restrict the backflow of exhaust gases into the intake port, and essentially unthrottled operation except where necessary to maintain engine stability, the reed valves also providing for a controlled internal EGR system. The phase shifting and use of intake reed valves will optimize the intake and exhaust event timing at the four major engine operating conditions of idle speed, part load, and wide open throttle low speed and high speed operation.

9 Claims, 6 Drawing Sheets

CAM PHASING & ENGINE OPERATION AT HIGH SPEED POWER

METHOD OF OPERATING AN AUTOMOTIVE TYPE INTERNAL COMBUSTION ENGINE

FIELD OF THE INVENTION

This invention relates in general to an automotive type engine timing system. More particularly, it relates to one in which the intake and exhaust valves are independently phase shifted to vary the timing to obtain better conditions of operation of the engine.

BACKGROUND OF THE INVENTION

Most commercially available automotive engines used fixed lift and duration intake and exhaust valve events. As a result, there must be a compromise between the best fuel economy, emission control, and engine power conditions.

Potentially better fuel economy, emission control and engine output benefits can be realized if the timing of these events can be varied depending on the engine operating modes. Further enhancement also can be obtained by the use of reed or one-way valves in the intake port. These would control the flow of intake and exhaust gases as a function of engine cylinder pressure, while at times providing internal exhaust gas recirculation (EGR) when needed to control oxides of nitrogen and unburned hydrocarbons (HC) levels. Further, utilizing unthrottled operation as much as possible would eliminate/minimize the engine pumping losses.

DESCRIPTION OF THE PRIOR ART

None of the prior art shows the use of independently varying or phasing the intake and exhaust valve timing, coupled with the use of reed valves or one-way valves in the intake port to obtain the most efficient engine operating conditions over the entire operating range utilizing internal EGR coupled with unthrottled operation eliminating or minimizing engine pumping losses by the use of the engine air throttle valve.

The prior art in general shows the use of mechanical or other means to permit phase shifting of intake and exhaust valves from a fixed schedule to improve engine operation. It also shows the use of reed valves per se. However, it fails to show the use of reed valves in the intake port coupled with the phase shifting of the valves and unthrottled engine operation.

U.S. Pat. No. 4,327,676 to McIntire et al. discloses a method of operating a diesel engine by controlling opening the intake and closing the exhaust valves to permit unburned fuel from passing through the exhaust valve. There is no valve overlap so that there is no internal EGR. The inlet valve opens 3° after top dead center and closes about 30° after bottom dead center. The exhaust valve opens 30° before bottom dead center and closes 3° before top dead center. There is no use of reed valves to control operation, and there is no adjustment or phase shifting.

U.S. Pat. No. 4,357,917 to Aoyama merely describes a system for changing the valve timing or varying the phase differences between the intake and exhaust cams to vary the timing of the opening and closing of the valves. Aoyama is concerned primarily with eliminating the engine pumping losses. Aoyama does use a throttle valve at times to induce a vacuum in the intake manifold to provide EGR. There is no use of reed valves or one-way valves. Aoyama discharges part of the exhaust back into the intake passage during the compression stroke.

U.S. Pat. No. 4,722,315 to Pickel shows an electromechanical system for controlling valve timing. It describes a diesel engine system for controlling EGR by controlling the opening and closing of the intake and exhaust valves. Pickel opens the intake valve no earlier than 30° past bottom dead center of the exhaust stroke to obtain EGR and uses only 15° to 30° of the maximum valve lift. No reed valves are used to prevent exhaust gas mixing at this time. The exhaust valve closes shortly before top dead center before the intake stroke and the intake valve is opened minimally during the exhaust stroke until the start of the intake stroke.

U.S. Pat. No. 2,880,711 and U.S. Pat. No. 2,997,991 to Roan describes and shows apparatus for varying the valve timing; however, no use of reed valves is made, nor any EGR employed. The timing schedule is quite different from that proposed.

U.S. Pat. No. 3,441,009 to Rafanelli is another example of a variable valve timing mechanism without the use of reed valves or internal EGR.

U.S. Pat. No. 3,981,276 to Ernest is directed primary to a rotary engine with sixteen wing-type reed valves at the intake port to essentially eliminate residual gas dilution of intake charges. There is no phase shifting of the intake and exhaust valves. The device uses a large capacity, two-staged carburetor that, therefore, provides throttling or pumping losses.

SUMMARY OF THE INVENTION

The method defined by this invention utilizes reed valves in the engine intake port, and the use of dual phase shifters for independent control of the intake and exhaust cams/valves, and a control system and actuators capable of controlling the phase of the cam lobes to a predetermined schedule. Inherent in the method is the control philosophy for the phasing of the cam shafts to produce minimum amounts of pumping work while minimizing emissions. The unique property of reed valves located in the intake port, coupled with the use of appropriate duration intake and exhaust cams will maximize the power output of the engine, provide maximum low speed torque, provide excellent idle quality with improved idle fuel consumption, and also provide improved brake specific fuel consumption and part load operation while yielding excellent control of $NO_x$ and HC emissions.

Early opening of the intake valve while the exhaust valve is open effects a closing of the reed or one-way valves to thereby provide a control of exhaust gas recirculation (EGR) by eliminating backflow into the intake and hence the volume of residual gas in the engine cylinder in an amount as desired. During other engine operating events, the reed or one-way valves operate to trap a portion of the engine charge and residual gases in the space between the intake port and intake valve under a high pressure. Thereafter, the trapped charge, when released into the engine cylinder clearance volume, improves exhaust scavenging and eliminates residual fraction retained in the cylinder, thereby improving the volumetric efficiency and low speed power.

It is therefore a primary object of the invention to provide a method of operating an engine by phase shifting the timing of opening and closing of the intake and exhaust valves, coupled with the use of reed valves in the intake ports to provide a controlled internal EGR with essentially unthrottled engine operation, thereby providing efficient fuel economy, emission control and engine other output benefits.

It is a further object of the invention to provide a method of operating an engine as described above in which the combining of dual camshaft phase shifting of the intake and exhaust valves with intake port reed valves allows for optimizing fixed event timing at wide open throttle and variable early intake valve closing at part load, thereby maintaining the capability for internal EGR and reducing the pumping losses and eliminating/minimizing detrimental blowback by unthrottled operation.

It is a still further object of the invention to provide a method as described above that will achieve excellent idle speed quality, high part load fuel economy, and eliminate external EGR while increasing low end knock limited torque while maintaining high RPM output capability.

Other objects, features and advantages of the invention will become more apparent upon reference to the succeeding, detailed description thereof and to the drawings illustrating the preferred embodiment thereof; wherein:

DESCRIPTION OF THE PREFERRED EMBODIMENT

Figure 1:
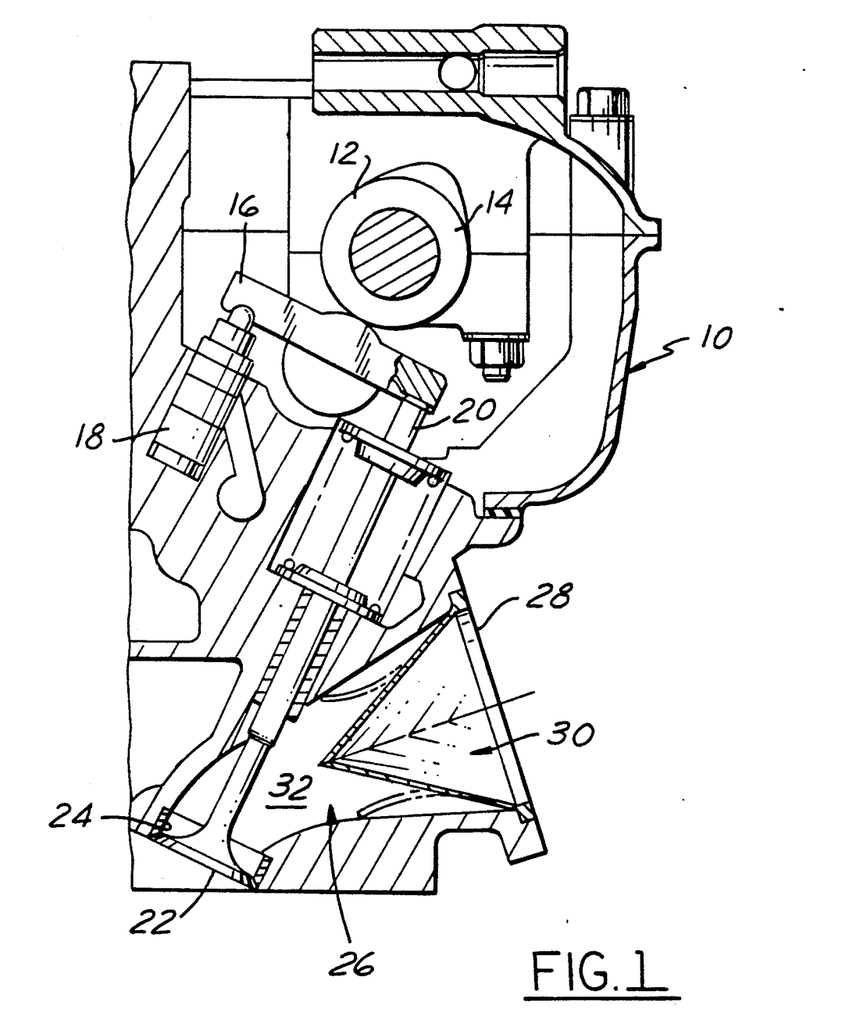
FIG. 1 is a schematic cross-sectional view of a portion of a cylinder head of an internal combustion engine embodying the invention.

FIG. 1 shows schematically a cross-section of a portion 10 of an engine cylinder head. It is of the overhead cam type having an intake cam 12 mounted on a camshaft 14, and a similar exhaust camshaft with exhaust cam lobes, not shown. The intake cam in this case engages a finger follower type rocker arm 16 pivotally mounted at one end as a fulcrum on a tappet 18. The other end receives the stem end 20 of an intake valve 22 reciprocably movable in and out of a valve seat 24 for opening and closing an intake passage 26. The passage connects the cylinder head to a conventional intake manifold indicated through a port 28.

Each intake port in this case contains a reed type valve or one-way valve 30 that is operable by the pressure differential between the intake manifold and intake passage 26. More specifically, the reed valve 30 permits the intake of fresh charge and gases when the intake manifold pressure is equal to or greater than the cylinder pressure or the pressure in passage 26. A higher pressure in passage 26 than in the intake manifold will cause the reed or one-way valve to close and block off inlet port 28. It should be noted that a small clearance space 32 is provided between the reed valve and intake valve 22, due to space requirements to install the reed valve. The spacer serves a purpose to be described later.

Other details of construction and operation of the reed valve, for example, and other components in the cylinder head are not given since they are known and believed to be unnecessary for an understanding of the invention. Suffice it to say that in this case, when the intake valve 22 is opened, if the cylinder pressure is greater than the intake manifold pressure, then the reed valve 30 will close and there will be no communication between the intake and exhaust valve ports or intake through the intake port.

Figure 2:
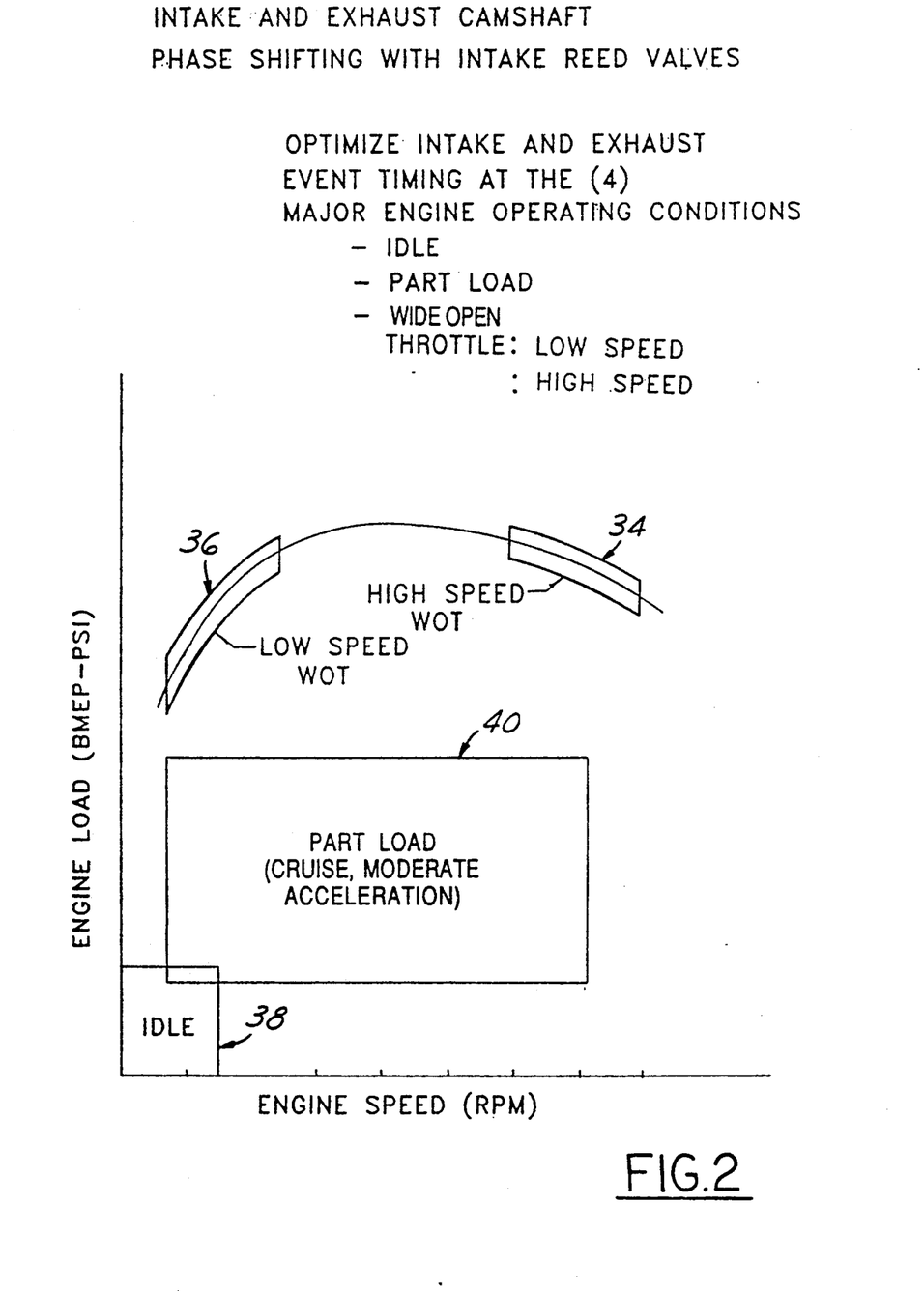
FIG. 2 illustrates schematically in block form the four significant engine operating modes to which the method of the invention is applied; and valve timing is optimized.

As stated previously, the specific method of engine operation of this invention uses the specific property of reed valves located in the intake ports, coupled with the use of appropriate duration intake and exhaust cams to, as shown in FIG. 2, maximize the power output of the engine at wide open throttle high speed, indicated at 34, provide maximum low speed torque at wide open throttle conditions at high engine load at 36, to provide excellent idle quality with improved idle fuel consumption at low engine speeds and load at 38, and finally, provide improved brake specific fuel consumption at part load operation while yielding excellent control of $NO_x$ and hydrocarbon emissions, as shown at the engine and load speeds indicated at 40.

As also stated previously, the method to be described requires the use of dual phase shifters for independent control of the intake and exhaust cams, and a control system and actuators capable of controlling the phase of the cam lobes. The details of construction and operation of phase shifters and a control system for the same are known and, therefore, also not given since they are believed to be unnecessary for an understanding of the invention.

The method to be described would benefit by having so-called "fast burn" engine operating features that allow maximum amounts of dilution with exhaust gases for control of $NO_x$ and HC emissions. Also, inherent in this concept is the control philosophy for the phasing of the camshafts to produce minimum amounts of pumping work while minimizing emissions, in the manner to be described.

Figure 3A:
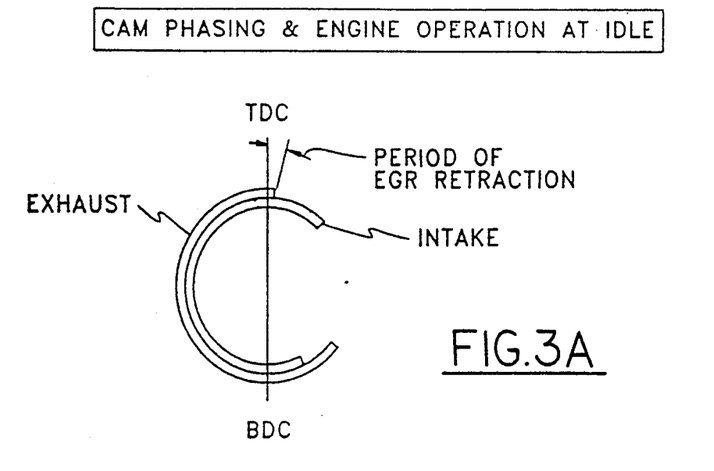
FIGS. 3A and 3B, 4A and 4B, 5A and 5B, and 6A and 6B illustrate schematically and graphically the conditions of engine operation at idle speed, part load, low speed, maximum power, and high speed power output, respectively.
Figure 3B:
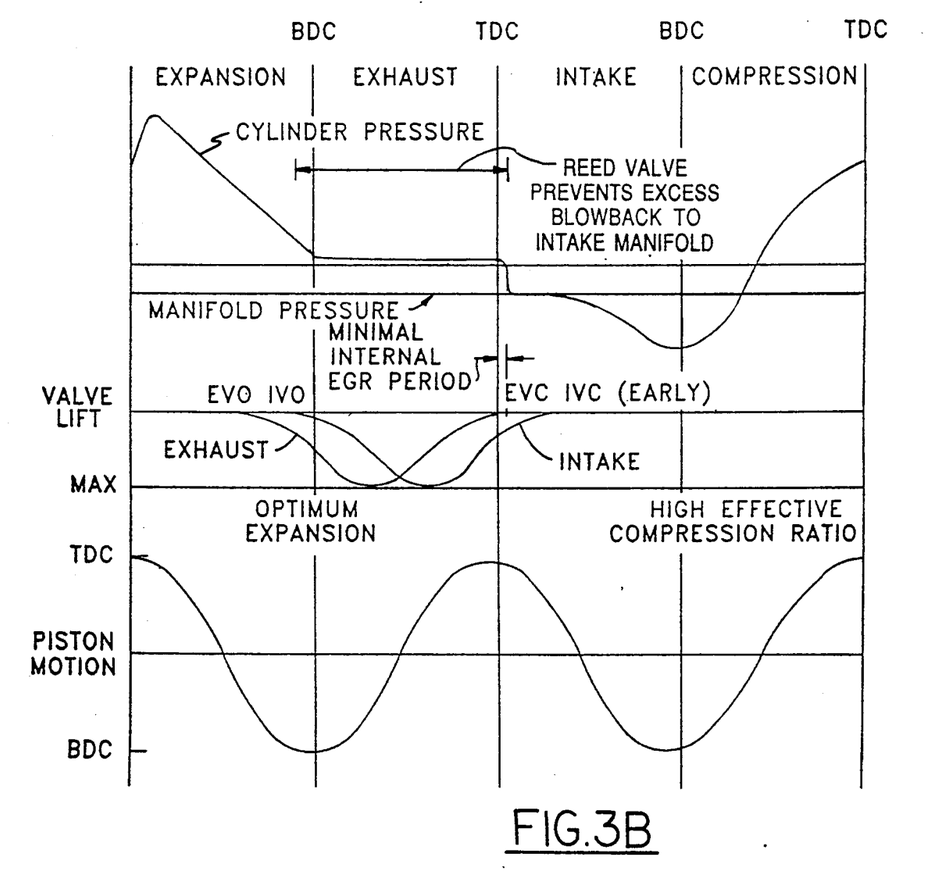

Turning now to FIGS. 3A and 3B, the first of four significant operating modes to obtain the desired conditions identified will now be described. FIGS. 3A and 3B illustrate the phasing of the intake and exhaust valve timing and duration coupled with the use of the reed valves 30 to obtain the most efficient engine operating conditions in the idle speed operating range indicated by the block 38 in FIG. 2. More specifically, FIG. 3B is a flat projection of a 720° crank angle cycle through the expansion, exhaust, intake and compression strokes, indicating the relative cylinder pressures during each phase or stroke, as well as the manifold pressures, valve lift, the locations in the cycle for opening and closing of the intake and exhaust valves, and the reciprocatory piston motion between top (TDC) and bottom (BDC) dead center positions.

The pumping losses are minimized, as seen in FIGS. 3A and 3B by using unthrottled operation and advancing the intake cam event so that the intake valve closes (indicated by IVC) early in the intake stroke; that is, the intake manifold pressure at this time is at or near atmospheric pressure, and the intake valve closes at a point when only that volume of charge will be inducted that is needed to overcome the rubbing friction of the engine and accessory drive.

For example, the intake valve may close at 50° after top dead center (TDC) of the intake stroke. The read valves become necessary since the intake valve opened early in the exhaust stroke. The reeds prevent the exhaust gases from flowing into the intake manifold hence reducing internal residual burned gases. The exhaust valve is closed near bottom dead center (BDC) of the intake event (0°-20° after BDC, for example. This keeps the residual fraction low for good idle combustion.

Figure 4A:
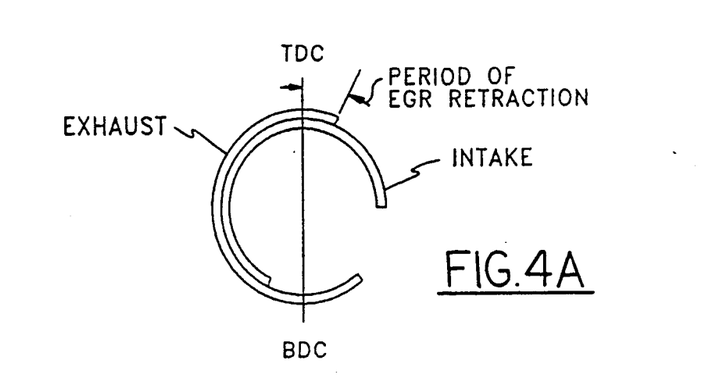
Figure 4B:
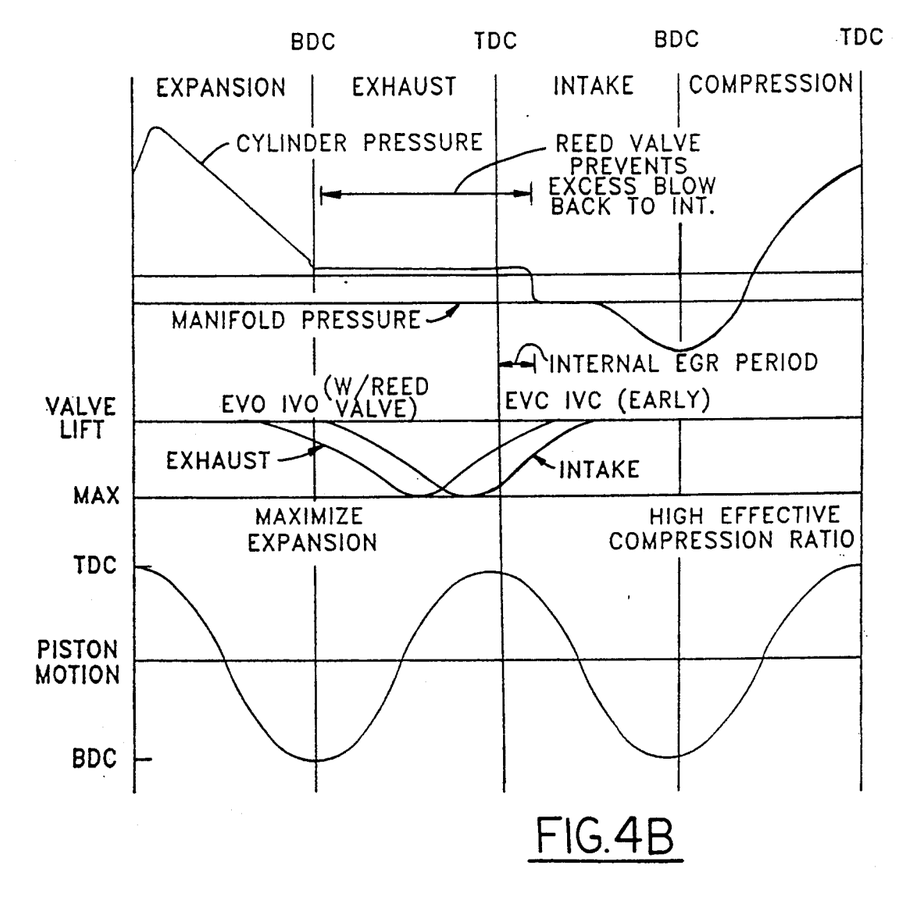

FIGS. 4A and 4B show the engine operating conditions at part load with phase shifting of the intake and exhaust valves. In this case, it will be seen that both the exhaust and intake valves are phase shifted to the right, as compared with the idle speed operating conditions. At all part load conditions, the phasing of the intake and exhaust cams controls the engine load. Throttling by a main throttle plate is only used if engine stability becomes an issue. Hence, the intake manifold pressure remains at atmospheric, and the intake cam is phase shifted to the appropriate position for the vehicle's demand, as shown. For example, at 1500 RPM engine speed and 2.62 bar-brake mean effective pressure (BMEP), the intake valve closing may be at, say, 70° crank angle after TDC in the intake stroke. This combination yields an effective way of creating early intake valve closing. This effectively eliminates the throttling losses produced by a normal cycle. The phase shifting of the intake and exhaust valves eliminates the need for an external EGR system and yields lower HC emissions while controlling $NO_x$. The exact position of the exhaust valve closing point (EVC) is determined by the trade-off between engine stability and $NO_x$ control.

Figure 5A:
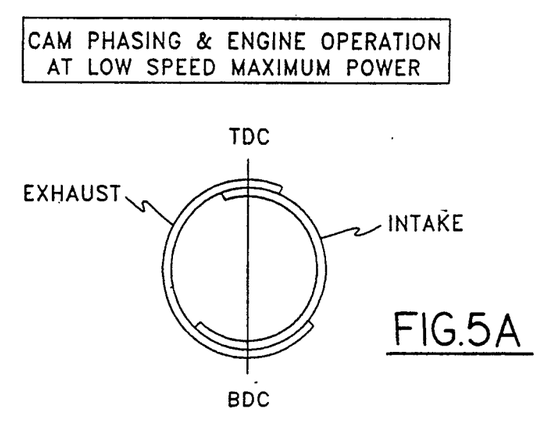
Figure 5B:
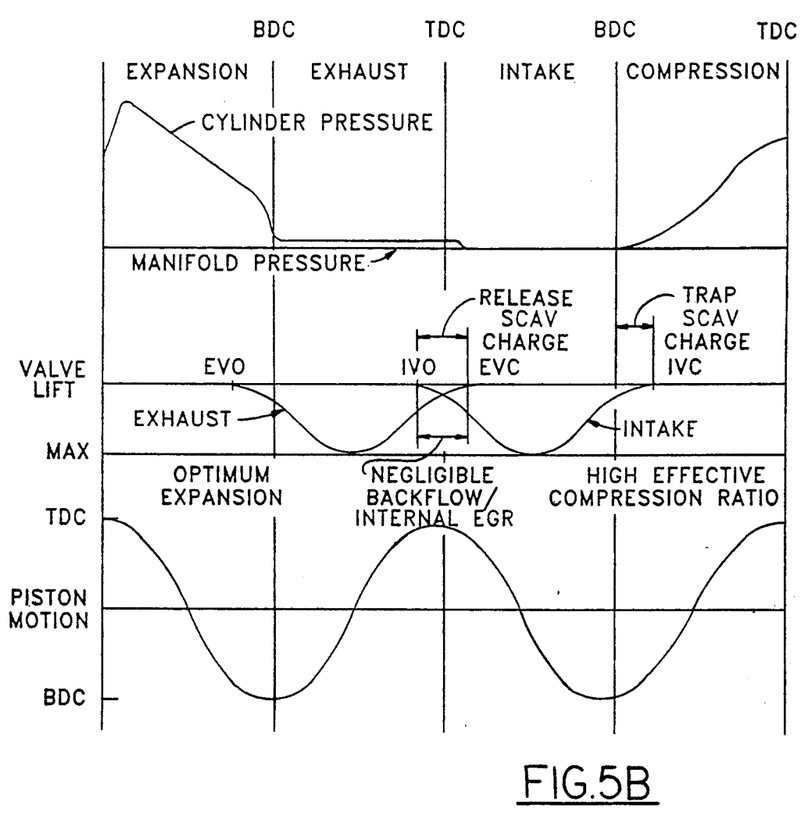

FIGS. 5A and 5B illustrate the engine operating conditions for low speed, maximum torque operation. In this case, the exhaust and intake valves are phase shifted to yield maximum torque. The intake valve in this case is opened (IVO) just slightly before TDC in the exhaust stroke, and the exhaust valve is closed (EVC) early in the intake stroke. The intake valve remains open into the compression stroke and is closed early (IVC) therein somewhere near 60°-70° after BDC in the compression stroke.

This late closing of the intake valve implies that the intake valve is open while the piston is moving toward TDC compressing the end cylinder contents. The fresh charge, therefore, will be trapped in the cylinder due to the action of the reed valves 30. That is, the reed valves will close as soon as the cylinder pressure rises to a certain level above the manifold pressure. However, in this case, as seen in FIG. 1, there is a small clearance space 32 between the intake port 28 and the inlet valve seat 24 so that when the reed valves 30 close during this condition of operation, a small amount of fresh charge and residuals will be pressurized and trapped in this space due to the piston upward motion. The composition of the gases in this volume will be lower in residuals than the end cylinder charge, and it will be at a higher pressure than atmospheric, as stated, due to the intake valve closing early in the compression stroke. When the intake valve again reopens, these higher pressure gases and charge trapped in the space 32 tend to scavenge the exhaust gases that are in the clearance volume into the exhaust port, thus reducing in-cylinder residuals. This has two beneficial effects on low speed torque: (1) the in-cylinder gases are lower in dilutent, and (2) the in-cylinder gases will be cooler or more dense. These two phenomena combine to allow more fresh charge to enter the cylinder, improving the volumetric efficiency and low speed power. The scavenging effect results in a 3-5% benefit in low speed torque, as compared with a normal operation.

Figure 6A:
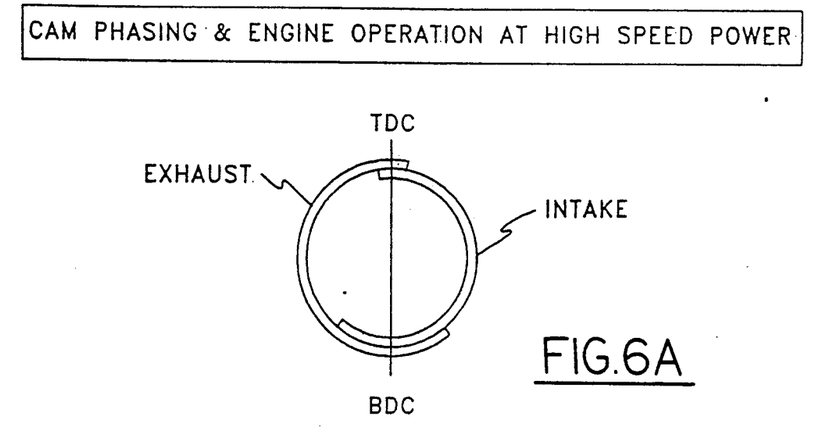
Figure 6B:
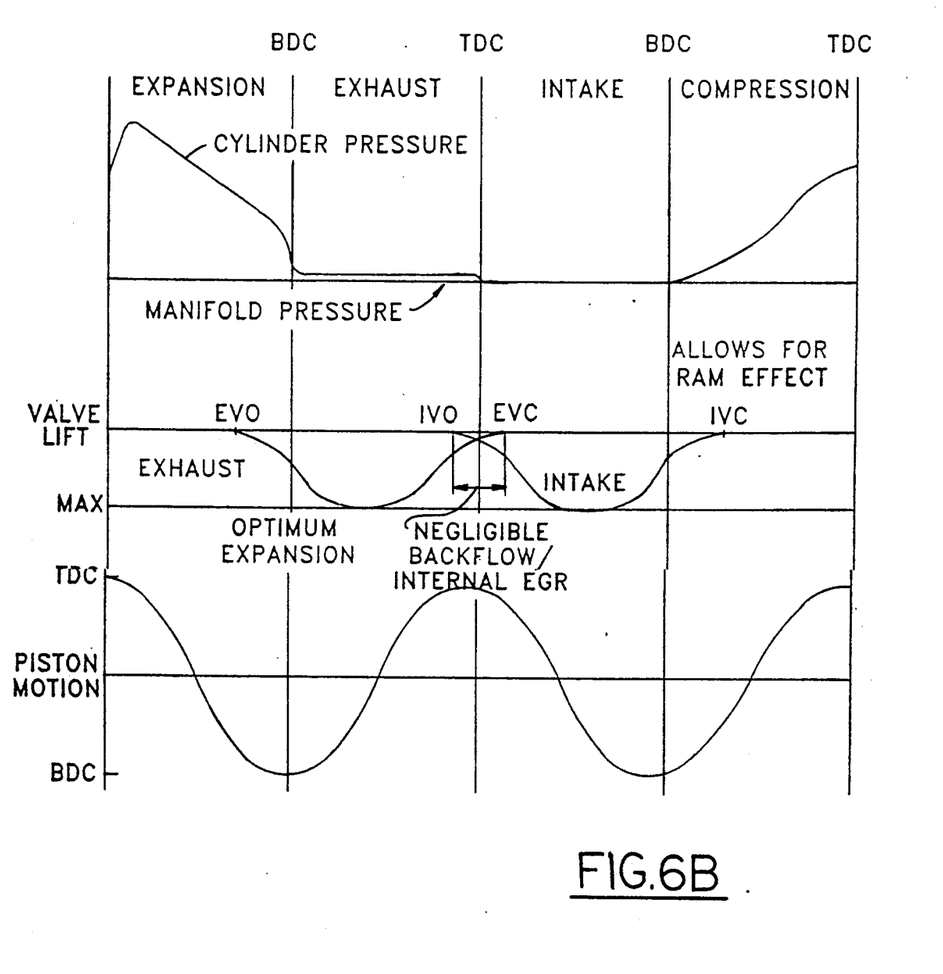

FIGS. 6A and 6B show the engine operating conditions at high speed power operation. In this case, the amount of internal EGR will be negligible, as indicated, since it is desired to induct into the engine as much fresh charge as is available to provide the high speed power. As a result, the exhaust valve is phase shifted to the left, as indicated, to close just slightly into the intake stroke, with the intake valve opening just slightly prior to that in the intake stroke and closing early in the compression stroke. In this case, during the overlap, it will be seen that the cylinder pressure is either near or at the manifold pressure, thereby allowing the inertia of the intake charge to keep the reed valve or one-way valve open and, therefore, the exhaust gases out.

FIG. 6A indicates the minimum overlap between the intake and exhaust valves. In this case, the high speed power benefit arises because the valve events, both intake and exhaust, can be optimized for the high speed power condition without sacrifice to idle, part load, or low speed high load operation. The cam events would be optimized for the high speed power. In effect, longer duration cam events would be chosen when compared to a normal engine that does not use reed valves or phase shifters.

From the foregoing, it will be seen that the engine can be operated to obtain very efficient operation by the use of cam phasing, or phase shifting of the normal intake and exhaust valve timing, coupled with the use of a reed valve in each intake port that will control internal EGR.

The operation is believed to be clear from a consideration of the above and the drawings and, therefore, will not be repeated in detail. However, briefly, at idle speed operation, as shown in FIGS. 3A and 3B, the exhaust and inlet valves are both opened (EVO-IVO) in the expansion stroke when the cylinder pressure is still higher than manifold pressure. This closes the reed valves 30 so that no flow exists between the exhaust valve and intake valve. This continues through the exhaust stroke into the intake stroke when the exhaust valve is closed (EVC) early. The overlap between the intake and exhaust valves at this point, when the cylinder pressure drops to or near manifold pressure, allows some intake of exhaust gases into the intake port through the opened reed valve to provide minimal internal EGR. The drop in cylinder pressure to the atmospheric level is provided by the unthrottled operation.

For operation at part load (FIGS. 4A and 4B), both exhaust and intake valve events are phase shifted to the right, with the reed valves 30 again preventing flow between the exhaust and intake valves until after the intake stroke is reached. At this point, there is a greater overlap between the valves and consequently a larger volume of internal EGR provided than at idle to combat the increased load and greater production of $NO_x$ and HC.

FIGS. 5A and 5B illustrate the conditions of operation at low speed, maximum torque. Again, the exhaust and intake valve events are phase shifted, with the exhaust valve being phase shifted only slightly while the intake valve is phase shifted to close early into the compression stroke. This results in a negligible backflow of exhaust gases into the intake manifold, as well as minimal internal EGR. This is a result of the early closing of the intake valve in the compression stroke pressurizing the space 32 between the intake port and intake valve after the reed valve 30 has closed to trap a volume of fresh charge and residual gas in that space when the intake valve again closes. Thereafter, when the intake valve again opens, just prior to the intake stroke, the high pressured gases will scavenge or force some of the fresh charge and exhaust gases out into the exhaust port and also some into the cylinder to dilute the charge therein in the clearance volume and cool the same, thereby improving the volumetric efficiency and the low speed power by allowing more fresh charge to enter the cylinder.

Finally, FIGS. 6A and 6B indicate the engine operating conditions for high speed where maximum power, maximum intake of fresh charge, and minimum or negligible internal EGR is desired. FIGS. 6A and 6B show very little overlap between the opening of the intake valve and closing of the exhaust valve and, therefore, negligible internal EGR and backflow into the intake manifold because of the early closing of the intake valve in the compression stroke. This also allows for ram effect of the air opening the reed valve delivering a large fresh charge while keeping out the exhaust gases.

While the invention has been shown and described in its preferred embodiment, it will be clear to those skilled in the arts to which it pertains that many changes and modifications may be made thereto without departing from the scope of the invention.

We claim:

1. A method of operating at part load engine operating conditions an automotive type internal combustion engine having an intake manifold with intake and exhaust ports and intake and exhaust valves movable, respectively, therein between open and closed positions, throttling means upstream of and associated with the intake port and variably movable between throttling and unthrottling positions to control flow through the intake port, and phase shifting means for varying the opening and closing of the valves from a fixed timing schedule as a function of operating conditions to obtain efficient operation and control of emissions, comprising the steps of:

first, inserting a one-way valve adjacent the intake port upstream of the intake valve operable to prevent flow of engine cylinder contents from the cylinder past the port while permitting intake flow of charge and gases into the cylinder in the opposite direction;

secondly, opening the engine exhaust valve during the engine expansion stroke at cylinder pressures higher than manifold pressure;

thirdly, with throttled control of the intake port only enough to maintain stable engine operation and to minimize engine pumping losses, and shortly after opening of the exhaust valve, opening the engine intake valve near piston bottom dead center position (BDC) between the engine expansion and exhaust strokes thereby effecting closing of the one-way valve under the influence of high cylinder pressure to block the intake flow of exhaust gases towards the intake port;

fourthly, maintaining the exhaust valve open later than normal into the initial portion of the engine intake stroke to a point where the motion of the piston during the intake stroke has permitted inflow of exhaust gases through the exhaust valve for exhaust gas recirculation (EGR) for minimum emission control;

fifthly, closing the exhaust valve shortly thereafter at a point when only that quantity of exhaust gases are influxed to provide the minimum EGR emission control that is necessary;

and finally, closing the intake valve early in the engine intake stroke after exhaust valve closure to minimize/eliminate engine pumping losses while providing the desired engine power.

2. A method as in claim 1, wherein the intake valve opens at a point in the exhaust stroke after piston BDC position.

3. A method as in claim 1 or 2, wherein the intake valve closes near 70° crank angle after piston top dead center position between the exhaust and intake strokes.

4. A method of operating at idle speed condition an automotive type internal combustion engine having an intake manifold with intake and exhaust ports and intake and exhaust valves movable, respectively, therein between open and closed positions, throttling means upstream of and associated with the intake port and variably movable between throttling and unthrottling positions to control flow through the intake port, and phase shifting means for varying the opening and closing of the valves from a fixed timing schedule as a function of operating conditions to obtain efficient operation and control of emissions, comprising the steps of:

first, inserting a one-way valve adjacent the intake port upstream of the intake valve operable to prevent flow of engine cylinder contents from the cylinder past the port while permitting intake flow of charge and gases into the cylinder in the opposition direction;

secondly, opening the engine exhaust valve during the engine expansion stroke at cylinder pressures higher than manifold pressure;

thirdly, with essentially unthrottled control of the intake port to minimize engine pumping losses, and shortly after opening of the exhaust valve, opening the engine intake valve thereby effecting closing of the one-way valve under the influence of high cylinder pressure to block the flow of exhaust gases towards the intake port;

fourthly, maintaining the exhaust valve open allowing the piston to draw in exhaust gases from the exhaust manifold for exhaust gas recirculation (EGR) for minimum emission control;

fifthly, closing the exhaust valve shortly thereafter at a point permitting only that quantity of exhaust gases to be influxed to provide the minimum EGR emission control that is necessary;

and finally, closing the intake valve early in the engine intake stroke after exhaust valve closure to provide only that amount of intake charge necessary to overcome engine friction and sustain engine operation while minimizing/eliminating engine pumping losses.

5. A method as in claim 4, wherein the exhaust valve closes in the range of 0° to 20° crank angle after piston top dead center position between the exhaust and intake strokes.

6. A method as in claim 4, wherein the intake valve closes at a point of approximately 50° crank angle after piston top dead center position between the exhaust and intake strokes.

7. A method as in claim 4, wherein the intake valve opens slightly before piston bottom dead center position between the engine expansion and exhaust strokes.

8. A method as in claim 4, wherein the closing of the intake valve occurs at a point when the manifold pressure is essentially atmospheric.

9. A method as in claims 4 or 8, wherein the exhaust valve closes at a point near piston top dead center position between the engine exhaust and intake strokes.

* * * * *